US009773498B2

(12) United States Patent
Stern et al.

(10) Patent No.: US 9,773,498 B2
(45) Date of Patent: *Sep. 26, 2017

(54) SYSTEM AND METHOD FOR MANAGING MODELS FOR EMBEDDED SPEECH AND LANGUAGE PROCESSING

(71) Applicant: AT&T Intellectual Property I, L.P., Atlanta, GA (US)

(72) Inventors: Benjamin J. Stern, Morris Township, NJ (US); Enrico Luigi Bocchieri, Chatham, NJ (US); Alistair D. Conkie, Morristown, NJ (US); Danilo Giulianelli, Whippany, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,292

(22) Filed: Dec. 1, 2016

(65) Prior Publication Data

US 2017/0084270 A1 Mar. 23, 2017

Related U.S. Application Data

(63) Continuation of application No. 14/064,579, filed on Oct. 28, 2013, now Pat. No. 9,530,416.

(51) Int. Cl.
*G10L 15/183* (2013.01)
*G10L 15/30* (2013.01)
*G10L 15/22* (2006.01)

(52) U.S. Cl.
CPC ............ *G10L 15/183* (2013.01); *G10L 15/22* (2013.01); *G10L 15/30* (2013.01); *G10L 2015/228* (2013.01)

(58) Field of Classification Search
CPC . G10L 15/30; G10L 15/183; G10L 2015/228; G10L 15/22
See application file for complete search history.

(56) References Cited

U.S. PATENT DOCUMENTS 6,487,534 B1 11/2002 Thelen et al.
6,704,707 B2 3/2004 Anderson et al.
(Continued)

OTHER PUBLICATIONS

Gomez, A.M. et al., "Speech-based user interaction for mobile devices," In Second ERCIM Workshop on Emobility, Tampere, Finland, May 30, 2008, pp. 49-63.
(Continued)

*Primary Examiner* — Angela A Armstrong

(57) ABSTRACT

Disclosed herein are systems, methods, and computer-readable storage devices for fetching speech processing models based on context changes in advance of speech requests using the speech processing models. An example local device configured to practice the method, having a local speech processor, and having access to remote speech models, detects a change in context. The change in context can be based on geographical location, language translation, speech in a different language, user language settings, installing or removing an app, and so forth. The local device can determine a speech processing model that is likely to be needed based on the change in context, and that is not stored on the local device. Independently of an explicit request to process speech, the local device can retrieve, from a remote server, the speech processing model for use on the mobile device.

20 Claims, 4 Drawing Sheets

(56) References Cited

U.S. PATENT DOCUMENTS

| | | |
|---|---|---|
| 7,212,970 B2 | 5/2007 | Rodrigo |
| 7,529,677 B1 | 5/2009 | Wittenberg |
| 7,890,329 B2 | 2/2011 | Wu et al. |
| 8,005,680 B2 | 8/2011 | Kommer |
| 8,185,392 B1 | 5/2012 | Strope et al. |
| 8,195,468 B2 | 6/2012 | Weider et al. |
| 8,265,928 B2 | 9/2012 | Kristjansson et al. |
| 8,332,218 B2 | 12/2012 | Cross, Jr. et al. |
| 8,352,246 B1 | 1/2013 | Lloyd |
| 8,452,598 B2 | 5/2013 | Kennewick et al. |
| 8,468,012 B2 | 6/2013 | Lloyd et al. |
| 8,515,762 B2 | 8/2013 | Krumel et al. |
| 8,571,857 B2 | 10/2013 | Mocenigo et al. |
| 8,868,428 B2 | 10/2014 | Gruenstein et al. |
| 9,530,416 B2 * | 12/2016 | Stern .................. G10L 15/183 |
| 2002/0194000 A1 | 12/2002 | Bennett |
| 2003/0182113 A1 | 9/2003 | Huang |
| 2004/0192384 A1 | 9/2004 | Anastasakos |
| 2006/0009980 A1 | 1/2006 | Burke et al. |
| 2006/0190260 A1 | 8/2006 | Iso-Sipila |
| 2006/0190268 A1 | 8/2006 | Wang |
| 2006/0235684 A1 | 10/2006 | Chang |
| 2008/0221880 A1 | 9/2008 | Cerra et al. |
| 2009/0043573 A1 | 2/2009 | Weinberg |
| 2009/0178144 A1 | 7/2009 | Redlich et al. |
| 2010/0049516 A1 | 2/2010 | Talwar et al. |
| 2010/0185448 A1 | 7/2010 | Meisel |
| 2010/0312555 A1 | 12/2010 | Plumpe et al. |
| 2011/0015928 A1 | 1/2011 | Odell et al. |
| 2012/0130714 A1 | 5/2012 | Zeljkovic et al. |
| 2012/0179464 A1 | 7/2012 | Newman et al. |
| 2012/0253823 A1 | 10/2012 | Schalk et al. |
| 2012/0265528 A1 | 10/2012 | Gruber et al. |
| 2012/0296643 A1 | 11/2012 | Kristjansson et al. |
| 2013/0006634 A1 | 1/2013 | Grokop et al. |
| 2013/0030802 A1 | 1/2013 | Jia et al. |
| 2013/0030804 A1 | 1/2013 | Zavaliagkos et al. |
| 2013/0103404 A1 | 4/2013 | Burke et al. |
| 2013/0144618 A1 | 6/2013 | Sun et al. |
| 2013/0151250 A1 | 6/2013 | VanBlon |
| 2013/0197915 A1 | 8/2013 | Burke et al. |
| 2015/0039299 A1 | 2/2015 | Weinstein |
| 2015/0079932 A1 | 3/2015 | Zelinka et al. |

OTHER PUBLICATIONS

M. Novak, "Towards large vocabulary ASR on embedded platforms," In *Proc. Interspeech*, Oct. 2004.

Chang, Y.S. et al., "CSR: A Cloud-assisted Speech Recognition Service for Personal Mobile Device," IEEE International Conference on Parallel Processing (ICPP), pp. 305-314, 2011.

Q. Li et al., "Automatic verbal information verification for user authentication," *IEEE Trans. Speech Audio Processing*, vol. 8, No. 5, pp. 585-596, 2000.

* cited by examiner

SYSTEM AND METHOD FOR MANAGING MODELS FOR EMBEDDED SPEECH AND LANGUAGE PROCESSING

PRIORITY INFORMATION

The present application is a continuation of U.S. patent application Ser. No. 14/064,579, filed Oct. 28, 2013, the contents of which is incorporated herein by reference in its entirety.

BACKGROUND

1. Technical Field

The present disclosure relates to speech processing and more specifically to predicting and managing speech and language processing models on embedded devices.

2. Introduction

Interactive speech technologies ("IST"), including Automatic Speech Recognition (ASR), Natural Language Understanding (NLU), Text-to-Speech Synthesis (TTS), and Machine Translation (MT) are valuable for hands-free/eyes-free interactions with applications running on mobile and other small devices, such as smartphones, tablets, in-car infotainment systems, home automation systems, and so forth. In many implementations, a network-based server performs IST tasks and communicates the results via a network to/from a local device. However, performing IST tasks on the local device can offer many benefits, such as reliably low latency responses, ability to operate under poor network conditions or when no network connection is available, the ability to tap into information available only on the local device such as calendar appointments, contacts list, personal info, and so forth to build better performing local models compared to generic network models, and reduced cost of building and maintaining large server networks.

However, mobile devices often have limited disk space, especially compared to network-based servers. Therefore, mobile devices cannot store as wide of a range of speech processing models that define the functionality of ISTs. This is particularly true for languages models that each include a separate set of TTS voice models, ASR acoustic and language models, and NLU models. Further, separate ASR and NLU models are usually trained for each task domain, such as dictation, SMS, web search, and so forth. Many of these models can be one to several gigabytes in size, which would quickly fill an unacceptably large fraction of local storage for a typical mobile device and would compete for space with the operating system, apps, photos, music, videos, and other digital content. Furthermore, a user may need speech processing models for applications or in languages that the user had not anticipated when setting up the mobile device.

DETAILED DESCRIPTION

Figure 1:
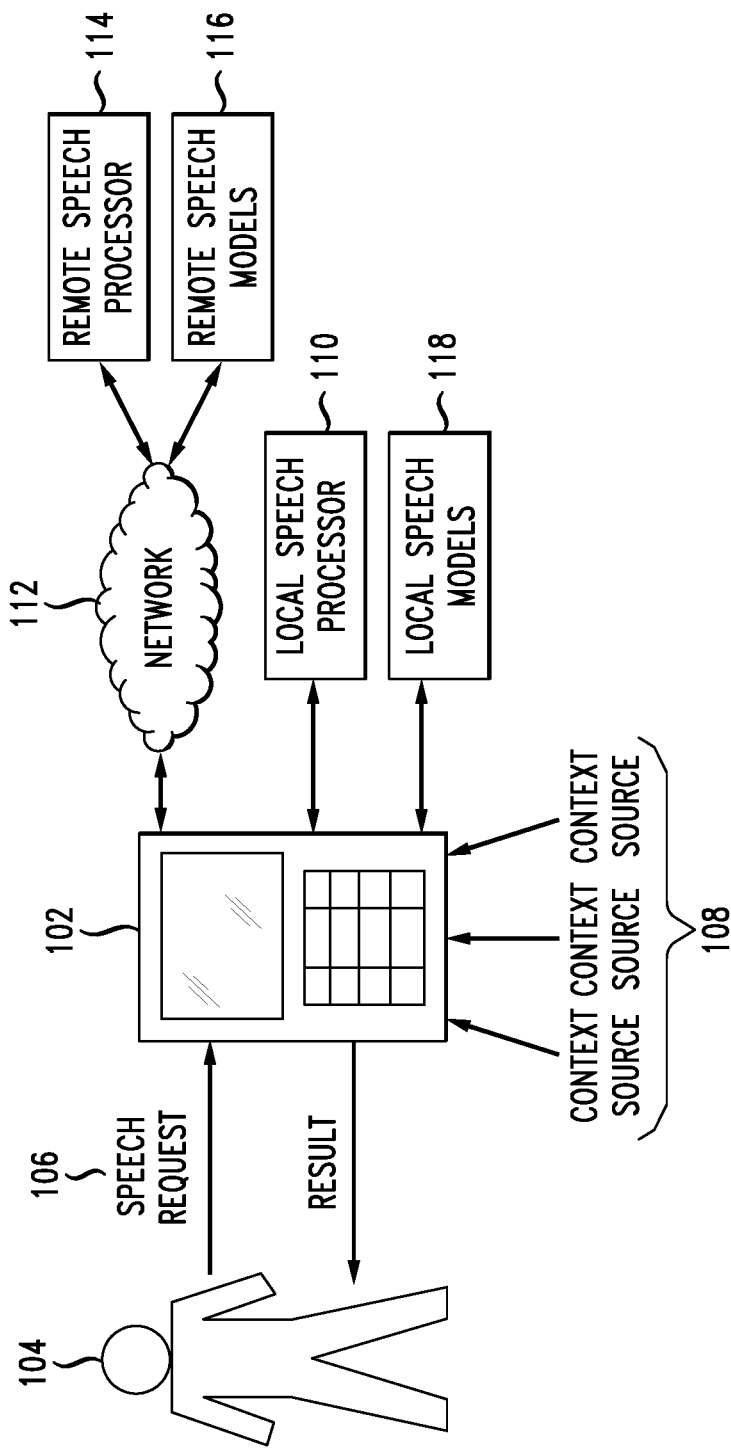
FIG. 1 illustrates an example speech processing architecture including a local device and a remote speech processor.

This disclosure presents several ways to identify which speech processing models are needed and make them available on a local device without overwhelming the limited storage space of the local device. Because local or mobile devices often have limited disk space compared to network servers, local devices cannot store a wide range of speech models that define and provide IST functionality. The approaches set forth herein describe how to store speech processing models on the device automatically, based on a set of factors, such as geographic location, loaded app content, usage patterns, or other predictive indicators. The same set of factors can be used to automatically determine speech processing models that are unlikely to be used and so can be removed. Speech processing models and tasks, regardless of whether referring to speech or natural language processing, are referred to herein as speech processing models. Speech processing models can include models for performing or assisting in ASR, NLU, TTS, and MT, as well as numerous other IST, speech, and language related tasks, such as dialog management or text translation.

A local device or a network-based service can automatically manage speech processing models stored on the device, in order to fetch, provision, download, update, or remove speech processing models as context factors change. When context factors change, the local device or a network-based service can predict which speech processing models are likely to be needed, determine which of those are unavailable on the local device, which speech processing models and how many can fit on the local device, and fetch or provision those speech processing models to the local device before they are needed. In this way, the speech processing models are already on the local device and ready for use before the local device makes a speech processing request. The local device or network-based service can predict which speech processing models are needed base on context changes, such as changes in loaded app content, location, usage patterns, available storage space, user preferences, network conditions, user preference changes, and so forth.

In one example, a daemon, app, or other service on the local device can monitor context changes, and determine which speech processing models are likely to be used by comparing the context changes with a usage history or other predictive factors. Then the local device can fetch the corresponding speech processing models from a network server. A network-based service can monitor context information or context change events from the local device, either by active polling or by receiving notifications of context changes from the local device. The network-based service can then make decisions regarding which speech processing models to provision to the local device over the network. For the sake of simplicity, the disclosure shall further refer to the local device only. However, when the disclosure refers to the local device taking some action relating to predicting which speech processing models are necessary or transferring speech processing models to the local device, it should be understood that a corresponding network-based service can perform the step in place of the local device. A speech processing management function on a local device can automatically detect changes in conditions or context that are reliable signals that particular new speech processing models are needed, or, conversely, that models that are already resident on the device are no longer needed. The speech processing management function can be a component of the operating system of the local device, a separate app, a component of each app that uses speech processing models, or part of each speech processing engine. In one scenario, when an app is installed on the local device, the app can register a set available speech processing models that the app can use, sources for those speech processing models, and a corresponding set of context factors and/or weights for the context factors that indicate that the available speech processing models is more likely to be used. The app can register the speech processing models with the speech processing management function, which can then monitor on behalf of the app and fetch speech processing models based on changes in context and predictive factors. Also, when all apps that require a speech processing model have been removed, the management function can remove the model.

Further, the system can track successes (i.e. when a speech processing model is requested and is already available on the device), failures (i.e. when a speech processing model is requested and is not available on the device), near-successes (i.e. when a speech processing model is requested and is still in the process of transfer to the device, or when a speech processing model is requested that was indicated as likely to be used, but something prevented its transfer to the local device such as a lack of disk space or other, higher priority speech processing models), and bad predictions (i.e. when a language model was indicated as "likely to be used" but was not used before being removed from the local device). Based on these successes, failures, near-successes, and bad predictions, the speech processing management function on the device can learn and adapt which sets of factors are predictive of speech processing models that are likely to be used. The speech processing management function can also use such analytics data to learn new predictive factors.

Automatically fetching speech processing models that are likely to be used can greatly increase the practicality of embedding speech technology on local devices and other devices that have limited storage space, with little or no action on the part of a user. This approach can significantly reduce instances of performing speech processing tasks via a network speech processor, thereby avoiding high latency and other problems associated with network based speech processors.

The local device can determine which speech processing models are likely to be used based on a combination of optionally weighted predictive factors, such as a type of utterance, an utterance history, a context of the local device, user preferences, wireless network signal strength, task domain (such as messaging, calendar, device commands, or dictation), grammar size, dialogue context (such as whether this is an error recovery input, or a number of turns in the current dialog), recent network latencies, the source of such network latencies (whether the latency is attributable to the speech processor or to network conditions, and whether those network conditions causing the increased latency are still in effect), recent embedded success/error rates (can be measured based on how often a user cancels a result, how often the user must repeat commands, whether the user gives up and switches to text input, and so forth), a particular language model being used or loaded for use, a security level for a speech processing request (such as recognizing a password), whether newer speech models are available in the network as opposed to on the local device, geographic location, loaded application or media content on the local device, or usage patterns of the user. Other possible predictive factors will be discussed below. The local device can combine all or some of these factors based on rules and/or machine learning and can weight the factors to determine which speech processing models are likely to be used, and request those likely speech processing models that are not present on the local device.

FIG. 1 illustrates an example speech processing architecture 100 including a local device 102 with a local speech processor 110 and locally stored speech models 118, and a remote speech processor 114 with remote speech models 116. The local device 102 receives information from multiple context sources 108 to decide which speech models are likely to be used. For example, the context sources can include whether the user is speaking into the microphone or entering text via a physical or on-screen keyboard. In one variation, the local device 102 polls context sources 108 for context data upon which to base a decision at some periodic interval. In another variation, the local device 102 continuously monitors or receives context data so that the context data can be used to evaluate which speech models are likely to be used at any time.

The local device 102 can consider various pieces of context data, factors, model update signals, or actions for predicting which speech models are likely to be used or requested. One factor is geographical location, such as when a mobile device appears in a country where a language is spoken that is not covered by on☐device models. When the geographical location indicates a new language that is not on the local device, the device can download one or more speech models in that language. For example, upon arriving in France, a smartphone of a US resident will detect its new location, and can request a French TTS voice model, French ASR acoustic model, French ASR language models, French NLU models, or French-English and English-French machine translation models from the remote speech models 116. In a related variation, when the smartphone determines from calendar data that a trip to France is less than 24 hours away, the smartphone can request these speech models in advance of the departing flight. In this way, the smartphone is ready to perform speech processing tasks in French before receiving any speech processing requests 106 in French. Similarly, when the smartphone leaves France, the speech processing management function can automatically remove the French-specific speech models.

Another factor is translation. If the user installs a language translation application on the smartphone, then the device can automatically download a speech model for effecting translation between the local language and the device owner's native language. A related factor is encountering speech in a new language. The local device 102 can employ a language detection system, which can be a relatively light☐weight system to identify the language being spoken by a user, to identify when the user or others around the user are speaking in different languages above a threshold certainty, above a threshold amount of time, or above a threshold frequency. Based on that factor, the local device 102 can fetch remote speech models 116 for the detected languages. Detection models for major languages can be stored on the device by default, and used independent of geography. Alternatively, the detection model for a specific language can be loaded when arriving in a relevant country. In another example, the system can detect when the user enables or installs international keyboards on the device. If a user then chooses to speak in a language that does not have models stored on the device, the language detector detects the new language, and can automatically download the appropriate set of remote speech models.

Another factor is installation, update, or removal of apps on the local device. When a new app is downloaded to a mobile device that has a speech input or output interface (which the local device 102 can detect by analyzing the app for flags or metadata or calls to speech-related APIs, then a speech model manager can automatically download any domain specific speech models that are required for that app or that the app is likely to request. For example, if the user downloads a shopping app, then the speech model manager on the local device 102 can check for an existing local language model 118 that covers related product names. If not, the speech model manager can download the appropriate remote speech model 116.

When context factors change, or at a predetermined time interval, the speech processing management function can inspect the likelihood of use of one or more speech models, and if the likelihood has fallen below a threshold for a model, the system can remove that model. The context factors for removing a model can include the time since a model was last used, user language settings, removing an app, geographic location, and usage patterns.

The user can set "sticky languages" for which the speech model manager flags certain speech models to remain in local storage on the local device 102. For example, if the user speaks two or more languages, a new app that uses domain specific grammars can trigger downloads of remote speech models 116 for all of the languages marked "sticky." Similarly, when visiting a country where a new language is spoken, the speech model manager can automatically download translation models for each sticky language.

Based on the context data 108, the local device 102 determines which speech models are likely to be used but not part of the local speech models 118. The local device 116 can then request and receive one or more of those remote speech models 116 via the network 112. Upon receiving additional speech models, the local device 102 can use those speech models to perform speech tasks locally upon receiving a speech request 106 from a user 104 or an application. The speech processing request can be a voice command, a request to translate speech or text, an application requesting text-to-speech services, etc. While FIG. 1 illustrates a single source of remote speech models 116, the local device 102 can interact with multiple sources of remote speech models. The device 102 can decide, on a per speech model basis, between different remote speech model sources. For example, competing speech processing vendors can provide remote speech models 116 at different price points, tuned for different performance characteristics, or for use with different speech processing models or engines.

Then, if the remote speech model 116 is provisioned to the local device 102 or incorporated as a local speech model 118 before the speech request 106, the local speech processor 110 on the local device 102 can perform the speech processing task. If the speech model is not provisioned to the local device 102 before the request, the local device 102 can either use another locally available speech model 118 that is a closest fit, or the local device 102 can pass the request to the remote speech processor 114 via the network 112.

In some cases, the local device 102 identifies multiple remote speech models 116 that are likely to be used, but is unable to store all of them. In these cases, the local device 102 can prioritize the speech models to determine which remote speech models 116 to request and store, as well as the order in which to request the remote speech models 116. The local device 102 can calculate a likelihood score that each likely remote speech model 116 will be used. The likelihood score can be based on a certainty of future use, urgency of future use or how soon the remote speech model is likely to be needed, reusability of the remote speech model for other likely tasks, and so forth. Then the local device 102 can sort the remote speech models 116 for download based on the likelihood scores. The local device 102 can prioritize remote speech model downloads based on which speech processing tasks are preferred or required to be performed on-device as opposed to those which speech processing tasks the remote speech processor 114 can reasonably perform.

Figure 2:
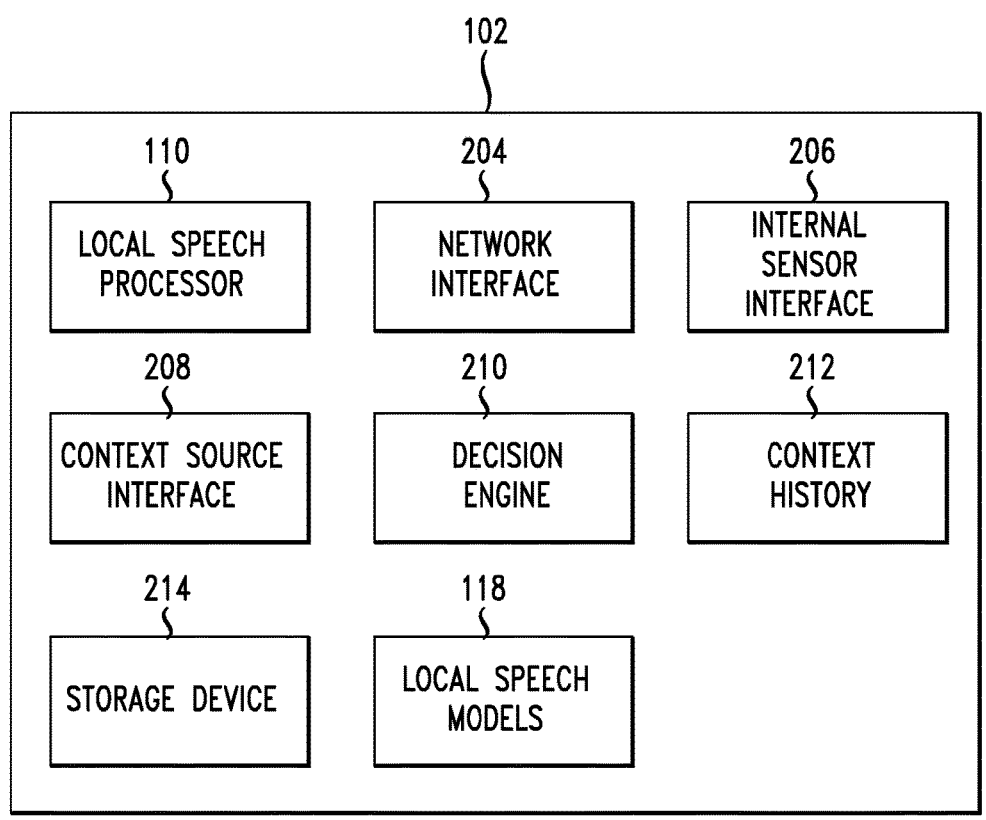
FIG. 2 illustrates some components of an example local device.

FIG. 2 illustrates some components of an example local device 102. This example local device 102 contains the local speech processor 110 which can be a software package, firmware, and/or hardware module. The example device 102 can include a network interface 204 for retrieving remote speech models 116 or for communicating with the remote speech processor 114. The local device 102 can receive context information from multiple sources, such as from internal sensors such as a microphone, accelerometer, compass, GPS device, Hall effect sensors, or other sensors via an internal sensor interface 206. The local device 102 can also receive context information from external sources via a context source interface 208 which can be shared with or part of the network interface 204. The local device 102 can receive context information from certain external sources via the network interface 204, such as available speech models and engines, versions of the speech models and engines, network conditions, availability of a Wi-Fi connection versus a cellular connection, availability of a 3G connection versus a 4G connection, user profile data, calendar data, and so forth. The local device 102 can receive certain portions of context via a user interface of the device, either explicitly or as part of input not directly intended to provide context information.

The decision engine 210 determines which pieces of context data are predictive of which speech models are likely to be used. The decision engine 210 can combine and weight the relevant pieces of context data, and output a decision or command to fetch or download the indicated speech models that are not present on the storage device 214 as local speech models 118. The decision engine 210 can also incorporate context history 212 in the decision making process. The context history 212 can track not only the context data itself, but also speech processing decisions made by the decision engine 210 based on the context data. The decision engine 210 can then re-use previously made decisions if the current context data is within a similarity threshold of context data upon which a previously made decision was based. A machine learning module can track the usage of local speech models 118 and "cache misses" where the local speech models 118 did not contain a requested speech model. The machine learning module can determine whether the output of the decision engine 210 was correct and provide feedback to the decision engine 210. This feedback can prompt the decision engine 210 to adjust the weights of one or more context factors, or which context factors to consider. Alternatively, when the feedback indicates that the decision was correct, the machine learning module can reinforce the selection of context factors and their corresponding weights.

The local device 102 can also include a set of rules that are generally applicable or specific to a particular user, speech request type, or application, for example. The rule set can override the outcome of the decision engine 210 after a decision has been made, or can preempt the decision engine 210 when a particular set of circumstances applies, effectively stepping in to force a specific decision before the decision engine 210 begins processing. The rule set can be separate from the decision engine 210 or incorporated as a part of the decision engine 210.

The decision engine 210 can perform a separate analysis of which speech models are likely to be used upon receiving each change in context. Alternatively, the decision engine 210 can bundle a set of context changes together, such examining context changes every 30 minutes, every hour, or every 24 hours. This time period can be based on the types of context information monitored or received. In one variation, context sources register with the context source interface 208 and provide a minimum interval at which the context source will provide new context information. In some cases, even if the context information changes, as long as the context information stays within a range of values, the decision engine can consider the context information as 'unchanged.' For example, if the location remains in the same city, then the actual GPS coordinates do not matter, and the decision engine can consider the location as 'unchanged.' If the location data indicates the user has traveled more than 50 miles beyond city limits, then the decision engine 210 can consider that context information 'changed.'

Figure 3:
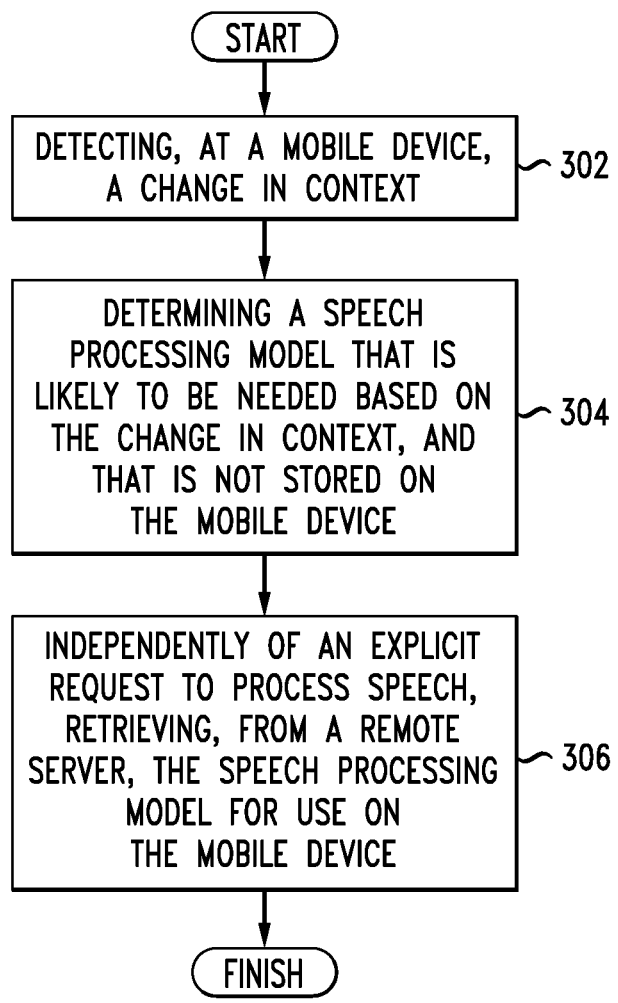
FIG. 3 illustrates an example method embodiment.
Figure 4:
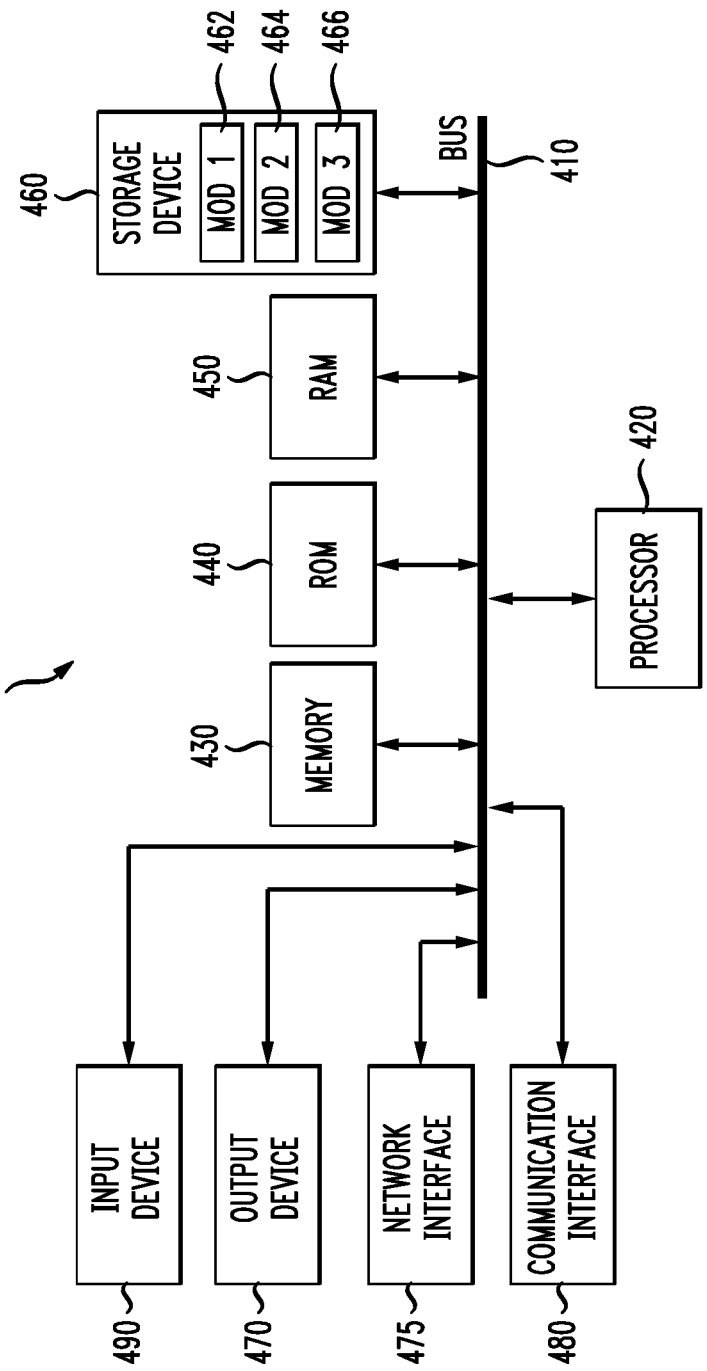
FIG. 4 illustrates an example system embodiment.

Having disclosed some basic system components and concepts, the disclosure now turns to the exemplary method embodiment shown in FIG. 3. For the sake of clarity, the method is described in terms of an exemplary system 400 as shown in FIG. 4 or local device 102 as shown in FIG. 1 configured to practice the method. The steps outlined herein are exemplary and can be implemented in any combination thereof, including combinations that exclude, add, or modify certain steps.

FIG. 3 illustrates an example method embodiment for fetching speech processing models based on context changes in advance of speech requests using the speech processing models. An example local device configured to practice the method, having a local speech processor and having access to remote speech models, detects a change in context (302). The change in context can be based on geographical location, language translation, speech in a different language, user language settings, installing or removing an app on the mobile device, or other factors or indicators that a specific speech model or type of language model is likely to be used or requested. The local device can determine a speech processing model that is likely to be needed based on the change in context, and that is not stored on the local device (304).

Independently of an explicit request to process speech, the local device can retrieve, from a remote server, the speech processing model for use on the mobile device (306). In one variation, the local device calculates a likelihood score that the speech processing model will be needed, and retrieves the speech processing model only when the likelihood score is above a threshold. When the local device determines that multiple speech processing models are likely to be needed based on the change in context, the local device can further determine priority rankings for the multiple speech processing models, and retrieve the multiple speech processing models from the remote server based on the priority rankings. The local device can compare network characteristics to a priority for the speech processing model to determine when to retrieve the speech processing model. For example, if the only available network is a 2G or other low-data-rate wireless network, the local device may choose to wait to download the remote speech model until a faster or more robust data network is available.

The local device can analyze a local storage of the mobile device to determine whether the local storage has sufficient storage space to store the speech processing model. Upon determining that the local storage has insufficient space to store the speech processing model, the device can identify, based on the change in context, a least-needed speech processing model stored in the local storage, and remove the least-needed speech processing model from the local storage. Similarly, the local device can analyze a local storage of the mobile device to determine whether the local storage has sufficient storage space to store the speech processing model. Upon determining that the local storage has insufficient space to store the speech processing model, the local device can identify, based on the change in context, speech processing models stored in the local storage that are less likely to be needed than the speech processing model, and remove a sufficient number of the speech processing models from the local storage to free storage space in the local storage to accommodate the storage model.

In a related variation, the local device can detect a change in context, determine that a speech processing model stored on the mobile device is below a threshold likelihood of use based on the change in context, and remove at least a portion of the speech processing model from the mobile device in response to the change in context. The threshold of likelihood of use can be based on available storage space on the local device for storing speech processing models. The threshold of likelihood of use can also be based on the time since a model was last used. The system can remove models that have not been used for sufficiently long time. The system can track how often speech models are removed from the mobile device, and other related metrics, such as how often a recently removed speech model is requested but unavailable. The local device can mark certain speech models that are below the threshold of likelihood as "ready for removal" but not remove those speech models until a request for the storage space is received. For example, the threshold of likelihood of use can be based on a size of an expected speech processing model to be received based on the change in context. The local device can further determine that the speech processing model stored on the mobile device is also below a threshold likelihood of other speech processing models stored on the mobile device.

If the local device determines that multiple speech processing models are below the threshold likelihood of use based on the change in context, the local device can further determine priority rankings for the multiple speech processing models, and remove the multiple speech processing models from the mobile device based on the priority rankings. The local device can alternately remove the multiple speech processing models from the mobile device based on the priority rankings until a threshold amount of storage space on the mobile device is freed.

Various embodiments of the disclosure are described in detail below. While specific implementations are described, it should be understood that this is done for illustration purposes only. Other components and configurations may be used without parting from the spirit and scope of the disclosure. A brief description of a basic general purpose system or computing device in FIG. 4 which can be employed to practice the concepts, methods, and techniques disclosed is illustrated.

An exemplary system and/or computing device 400 includes a processing unit (CPU or processor) 420 and a system bus 410 that couples various system components including the system memory 430 such as read only memory (ROM) 440 and random access memory (RAM) 450 to the processor 420. The system 400 can include a cache of high speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 4 462, module 2 464, and module 3 466 stored in storage device 460, configured to control the processor 420 as well as a special-purpose processor where software instructions are incorporated into the processor. The processor 420 may be a self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. The system 400 can include other hardware or software modules. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out a particular function. In another aspect, the system can use a processor and computer-readable storage medium to store instructions which, when executed by the processor, cause the processor to perform a method or other specific actions. The basic components and appropriate variations can be modified depending on the type of device, such as whether the device 400 is a small, handheld computing device, a desktop computer, or a computer server.

Although the exemplary embodiment(s) described herein employs the hard disk 460, other types of computer-readable media which can store data that are accessible by a computer, such as magnetic cassettes, flash memory cards, digital versatile disks, cartridges, random access memories (RAMs) 450, read only memory (ROM) 440, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 420. The functions these blocks represent may be provided through the use of either shared or dedicated hardware, including, but not limited to, hardware capable of executing software and hardware, such as a processor 420, that is purpose-built to operate as an equivalent to software executing on a general purpose processor. For example the functions of one or more processors presented in FIG. 4 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 440 for storing software performing the operations described below, and random access memory (RAM) 450 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 400 shown in FIG. 4 can practice all or part of the recited methods, can be a part of the recited systems, and/or can operate according to instructions in the recited tangible computer-readable storage media. Such logical operations can be implemented as modules configured to control the processor 420 to perform particular functions according to the programming of the module. For example, FIG. 4 illustrates three modules Mod1 462, Mod2 464 and Mod3 466 which are modules configured to control the processor 420. These modules may be stored on the storage device 460 and loaded into RAM 450 or memory 430 at runtime or may be stored in other computer-readable memory locations.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to embedded speech technologies, such as in-car systems, smartphones, tablets, set-top boxes, in-home automation systems, and so forth. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
    detecting, at a mobile device, a change in geographic location of the mobile device to yield a new context of a speech dialogue;
    calculating a likelihood score for each speech model in a plurality of speech models on a remote server, wherein the likelihood score indicates a compatibility of each speech model to recognize speech in the speech dialogue in the new context to yield likelihood scores;
    selecting a speech model from the plurality of speech models according to the likelihood scores;
    calculating local likelihood scores of local speech models stored in a local storage of the mobile device, wherein the local likelihood scores indicate a probability of each local speech model to recognize the speech in the speech dialogue in the new context to yield a respective scored local speech model; and
    removing the respective scored local speech model having a lowest likelihood score of the local likelihood scores until a sufficient space for the speech model from the remote server is made available on the mobile device.

2. The method of claim 1, wherein the likelihood scores are calculated according to one or more of a certainty of future use, an urgency of future use, and a reusability of each speech model in the plurality of speech models.

3. The method of claim 1, wherein the likelihood scores are weighted according to one or more of historical data comprising contextual history and speech model usage.

4. The method of claim 1, wherein the new context is further based on one of language translation, speech in a different language, user language settings, available local storage, installation of an application on the mobile device, and removal of the application on the mobile device.

5. The method of claim 1, further comprising:
    comparing network characteristics to a priority for the speech model to determine when to retrieve the speech model.

6. The method of claim 1, further comprising:
    determining that an existing speech model stored on the mobile device has a lower likelihood score than the speech model; and
    removing the existing speech model from local storage on the mobile device.

7. The method of claim 1, further comprising identifying the plurality of speech models on the remote server.

8. A system comprising:
    a processor; and
    a computer-readable storage medium having instructions stored which, when executed by the processor, cause the processor to perform operations comprising:
        detecting, at a mobile device, a change in geographic location of the mobile device to yield a new context of a speech dialogue;
        calculating a likelihood score for each speech model in a plurality of speech models on a remote server, wherein the likelihood score indicates a compatibility of each speech model to recognize speech in the speech dialogue in the new context to yield likelihood scores;
        selecting a speech model from the plurality of speech models according to the likelihood scores;
        calculating local likelihood scores of local speech models stored in a local storage of the mobile device, wherein the local likelihood scores indicate a probability of each local speech model to recognize the speech in the speech dialogue in the new context to yield a respective scored local speech model; and
        removing the respective scored local speech model having a lowest likelihood score of the local likelihood scores until a sufficient space for the speech model from the remote server is made available on the mobile device.

9. The system of claim 8, wherein the new context is based on one or more of unused storage space on the mobile device crossing a threshold, language translation, speech in a different language, user language settings, installing an application on the mobile device, and removing the application on the mobile device.

10. The system of claim 8, wherein the likelihood scores are calculated according to one or more of a certainty of future use, an urgency of future use, and a reusability of each speech model in the plurality of speech models.

11. The system of claim 8, wherein the likelihood scores are weighted according to historical data comprising one or more of contextual history and speech model usage.

12. The system of claim 8, the computer-readable storage medium having additional instructions stored which, when executed by the processor, cause the processor to perform operations comprising:
   determining that an existing speech model stored on the mobile device has a lower likelihood score than the speech model; and
   removing the existing speech model from local storage on the mobile device.

13. The system of claim 8, the computer-readable storage medium having additional instructions stored which, when executed by the processor, cause the processor to perform operations comprising:
   determining that a plurality of previously stored speech models on the mobile device have likelihood scores below a threshold likelihood score, to yield below-threshold speech models; and
   removing the below-threshold speech models from the mobile device.

14. The system of claim 13, wherein the removing of the below-threshold speech models from the mobile device occurs only until a threshold amount of storage space on the mobile device is freed.

15. A computer-readable storage device having instructions stored which, when executed by a computing device, cause the computing device to perform operations comprising:
   detecting, at a mobile device, a change in geographic location of the mobile device to yield a new context of a speech dialogue;
   calculating a likelihood score for each speech model in a plurality of speech models on a remote server, wherein the likelihood score indicates a compatibility of each speech model to recognize speech in the speech dialogue in the new context to yield likelihood scores;
   selecting a speech model from the plurality of speech models according to the likelihood scores;
   calculating local likelihood scores of local speech models stored in a local storage of the mobile device, wherein the local likelihood scores indicate a probability of each local speech model to recognize the speech in the speech dialogue in the new context to yield a respective scored local speech model; and
   removing the respective scored local speech model having a lowest likelihood score of the local likelihood scores until a sufficient space for the speech model from the remote server is made available on the mobile device.

16. The computer-readable storage device of claim 15, wherein the likelihood scores are calculated according to one or more of a certainty of future use, an urgency of future use, and a reusability of each speech model in the plurality of speech models.

17. The computer-readable storage device of claim 15, wherein the likelihood scores are weighted according to one or more of historical data comprising contextual history and speech model usage.

18. The computer-readable storage device of claim 15, wherein the new context is based on one of language translation, speech in a different language, user language settings, available local storage, installing an application on the mobile device, and removing the application on the mobile device.

19. The computer-readable storage device of claim 15, having additional instructions stored which, when executed by the computing device, cause the computing device to perform operations comprising:
   comparing network characteristics to a priority for the speech model to determine when to retrieve the speech model.

20. The computer-readable storage device of claim 15, the computer-readable storage device having additional instructions stored which, when executed by the computing device, cause the computing device to perform operations comprising:
   determining that a plurality of previously stored speech models on the mobile device have likelihood scores below a threshold likelihood score, to yield below-threshold speech models; and
   removing the below-threshold speech models from the mobile device.

* * * * *